United States Patent
Hildenbrand et al.

(10) Patent No.: US 10,417,047 B2
(45) Date of Patent: Sep. 17, 2019

(54) VIRTUAL MACHINE MEMORY OVERCOMMIT BY REVERSE BALLOONING

(71) Applicant: Red Hat, Inc., Raleigh, NC (US)

(72) Inventors: David Hildenbrand, Grasbrunn (DE); Michael Tsirkin, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 96 days.

(21) Appl. No.: 15/828,996

(22) Filed: Dec. 1, 2017

(65) Prior Publication Data
US 2019/0171486 A1 Jun. 6, 2019

(51) Int. Cl.
*G06F 9/50* (2006.01)
*G06F 9/455* (2018.01)
*G06F 12/00* (2006.01)

(52) U.S. Cl.
CPC ........ *G06F 9/5016* (2013.01); *G06F 9/45533* (2013.01); *G06F 9/45558* (2013.01); *G06F 9/5077* (2013.01); *G06F 12/00* (2013.01); *G06F 2009/45583* (2013.01)

(58) Field of Classification Search
None
See application file for complete search history.

(56) References Cited

U.S. PATENT DOCUMENTS

| 8,161,260 | B2 | 4/2012 | Srinivasan |
| 8,943,260 | B2 | 1/2015 | Ben-Yehuda et al. |
| 9,390,028 | B2 | 7/2016 | Gordon et al. |
| 9,529,611 | B2 | 12/2016 | McDougall et al. |
| 9,552,495 | B2 | 1/2017 | Yang et al. |
| 2013/0047152 | A1* | 2/2013 | Low ..................... G06F 9/45558 718/1 |
| 2013/0047159 | A1* | 2/2013 | Low ..................... G06F 9/45558 718/1 |
| 2015/0199209 | A1* | 7/2015 | Tsirkin ................. G06F 9/45545 718/1 |
| 2017/0075729 | A1 | 3/2017 | Waldspurger |

OTHER PUBLICATIONS

DrillingFormulas.com; Tubing Lenth Change due to Ballooning; http://www.drillingformulas.com/tubing-length-change-due-to-ballooning/; published Jul. 3, 2016; retrieved Aug. 31, 2017 (7 pages).
Unknown; Allocating Memory to a Virtual Machine; https://stuff.mit.edu/afs/sipb/project/vmdialup/lib/vmware-console/help-manual/performance_mem_size_gsx.htm; retrieved Aug. 31, 2017; (2 pages).

* cited by examiner

*Primary Examiner* — Qing Yuan Wu
(74) *Attorney, Agent, or Firm* — K&L Gates LLP

(57) ABSTRACT

A virtual machine memory overcommit system includes an initialization memory, a device memory, at least one processor in communication with the initialization memory and the device memory, a guest operating system (OS) including a device driver, and a hypervisor executing on the at least one processor. The hypervisor is configured to expose the initialization memory to the guest OS of a virtual machine, initialize the guest OS, and expose the device memory to the guest OS. The device driver is configured to query an amount of memory available from the device memory and report the amount of memory available to the guest OS.

20 Claims, 6 Drawing Sheets

VIRTUAL MACHINE MEMORY OVERCOMMIT BY REVERSE BALLOONING

BACKGROUND

Computer systems may run virtual machines with memory allocated by a hypervisor. With memory overcommit, virtual machines and their associated guest operating systems may "think" that they have access to more memory than is actually assigned by the hypervisor. For example, memory overcommit (or overcommitment) is a hypervisor feature that allows a virtual machine, in effect, to use more memory space than the physical host has available. To achieve memory overcommit, the hypervisor may reallocate memory by adding and/or removing memory from other virtual machines as physical memory permits.

SUMMARY

The present disclosure provides new and innovative systems and methods for virtual machine memory overcommit by reverse ballooning. In an example, a system includes an initialization memory, a device memory, at least one processor in communication with the initialization memory and the device memory, a guest operating system (OS) including a device driver, and a hypervisor executing on the at least one processor. The hypervisor is configured to expose the initialization memory to the guest OS of a virtual machine, initialize the guest OS, and expose the device memory to the guest OS. The device driver is configured to query an amount of memory available from the device memory and report the amount of memory available to the guest OS.

In an example, a method includes exposing, by a hypervisor, an initialization memory to a guest operating system of a virtual machine. Additionally, the hypervisor initializes the guest OS and exposes a device memory to the guest OS. A device driver queries an amount of memory available from the device memory and reports the amount of memory available to the guest OS.

In an example, a non-transitory machine readable medium stores code, which when executed by a processor, is configured to expose an initialization memory to a guest operating system of a virtual machine, initialize the guest OS, expose a device memory to the guest OS, query an amount of memory available from the device memory, and report the amount of memory available to the guest OS.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
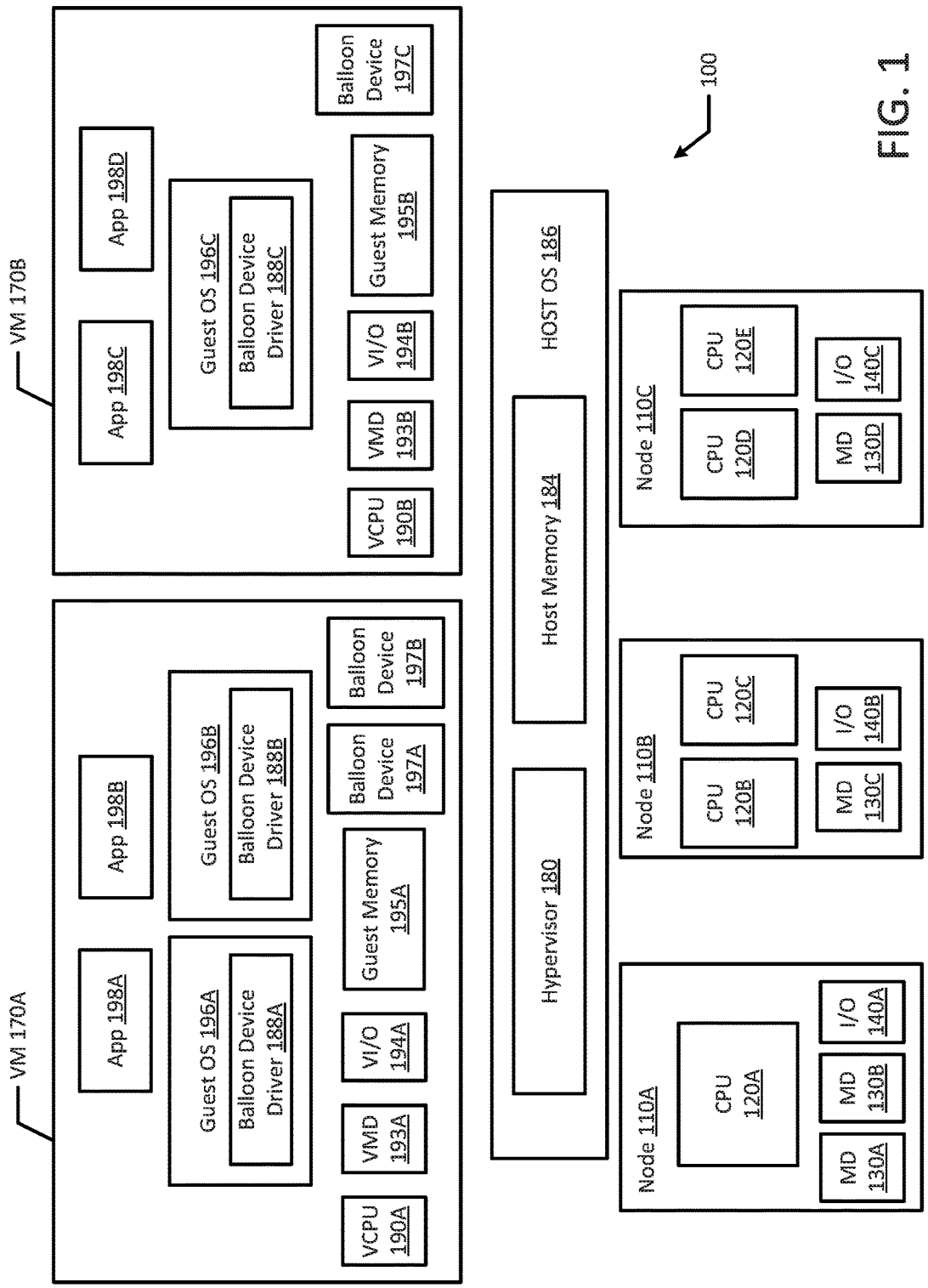
FIG. 1 illustrates a block diagram of an example computing system according to an example embodiment of the present disclosure.

Techniques are disclosed for virtual machine memory overcommit by reverse ballooning. For example, the techniques disclosed may be used to prevent a virtual machine from prematurely accessing memory. Additionally, the techniques disclosed may be used to allocate additional memory to a virtual machine and return unused memory of the virtual machine back to a hypervisor, for example, so the hypervisor can allocate the memory to other guests and/or virtual machines for other processes and tasks. Often times, with memory overcommit, guests (e.g., guest operating systems) may "think" that their associated virtual machines have more memory than the amount of memory assigned by the hypervisor. Currently, techniques of memory overcommit are implemented by a balloon driver that takes guest memory and hands that memory back to the host, thereby preventing the guest from accessing the memory and allowing the memory to be reallocated by the hypervisor. However, for the balloon driver implementation to work properly, the balloon driver needs to be initialized early in the boot sequence in order to prevent the guest from trying to use more memory than permitted. For example, the guest may use or attempt to use too much memory relative to what the system permits for initialization, for example, all of the available virtual machine memory. When the balloon driver is initialized late or initialization is disabled, the balloon driver does not prevent the guest from trying to use more of the virtual machine memory than permitted, the guest may use more memory than intended, and the hypervisor may have to allocate more memory to the virtual machine or fail the request (e.g., stop the virtual machine) to account for the insufficient memory. While achieving early initialization is possible, balloon driver startup is often delayed, which may cause the hypervisor to allocate additional memory and/or stop the virtual machine thereby reducing system performance and available system resources and reducing hardware utilization and/or virtual machine density. For example, a delayed balloon driver startup may cause the guest to crash and reduce system performance.

As described in the various example embodiments disclosed herein, to prevent the guest from prematurely using more than its intended amount of memory, some memory is initially unavailable to the virtual machine, while initialization memory is provided to the virtual machine for the guest to initialize. The remaining memory is exposed to the guest as device memory (e.g., balloon device memory), which is available to a device driver (e.g., balloon device driver). After the device driver initializes, the device driver queries the amount of usable balloon device memory from the device, deflates the balloon device according to the queried amount and reports the deflated balloon device memory as available memory (e.g., random access memory "RAM") to the guest OS. The device driver exposes memory to the guest as needed, which advantageously prevents the guest from using memory until after the device driver initializes. Additionally, the device driver may request unused balloon device memory from the guest OS and return the unused balloon device memory to the hypervisor by inflating the balloon device. Thus, the various example embodiments disclosed herein advantageously prevent the guest from crashing and conserve system resources by preventing the guest from using more memory than allowed, even if the device driver initialization is delayed or if the device driver is disabled, for example, during a safe boot. Additionally, the device driver enables the hypervisor to reclaim unused memory to reallocate the memory to other processes and tasks (e.g., other virtual machines, housekeeping or maintenance) to achieve and advantageously efficient virtual machine memory overcommit.

FIG. 1 depicts a high-level component diagram of an example computing system 100 in accordance with one or more aspects of the present disclosure. The computing system 100 may include an operating system (e.g., host OS 186), one or more virtual machines (VM 170A-B), nodes (e.g., nodes 110A-C), and balloon device memory. Balloon device memory may be memory of one or more memory devices (130A-D) or balloon devices 197A-C (e.g., paravirtualized memory devices).

Virtual machines 170A-B may include a guest OS, guest memory, a virtual CPU (VCPU), virtual memory devices (VMD), and virtual input/output devices (VI/O). For example, virtual machine 170A may include guest OS 196A-B, guest memory or virtual machine memory 195A, a virtual CPU 190A, a virtual memory devices 193A, a virtual input/output device 194A, and balloon device 197A-B. Guest OS 196A may include balloon driver 188A and Guest OS 196B may include balloon driver 188B. Virtual machine memory 195A may include one or more memory pages. Similarly, virtual machine 170B may include guest OS 196B, virtual machine memory 195B, a virtual CPU 190B, a virtual memory devices 193B, and virtual input/output device 194B, and balloon device 197C. Guest OS 196C may include balloon driver 188C. Virtual machine memory 195B may include one or more memory pages.

The computing system 100 may also include a hypervisor 180 and host memory 184. Hypervisor 180 may manage host memory 184 for the host operating system 186 as well as memory allocated to the virtual machines 170A-B and guest operating systems 196A-C such as guest memory or virtual machine memory 195A-B provided to guest OS 196A-C. Host memory 184 and virtual machine memory 195A-B may be divided into a plurality of memory pages that are managed by the hypervisor 180. Virtual machine memory 195A-B allocated to the guest OS 196A-C may be mapped from host memory 184 such that when a guest application 198A-D uses or accesses a memory page of virtual machine memory 195A-B, the guest application 198A-D is actually using or accessing host memory 184.

Hypervisor 180 may be configured to expose an initialization memory to a guest OS (e.g., guest OS 196A-C) to initialize the guest OS 196A-C. Additionally, the hypervisor 180 may be configured to expose device memory, such as balloon device memory (e.g., memory of balloon device 197A-C) to the guest OS 196A-C. For example, hypervisor 180 may expose device memory of balloon devices 197A-B to guest OS 196A. In another example, hypervisor 180 may expose device memory of balloon device 197A to guest OS 196A and may expose device memory of balloon device 197B to guest OS 196B. Device drivers, for example balloon device drivers 188A-C, may be configured to query an amount of memory available from the device memory. Hereinafter balloon device drivers 188A-C may be referred to more generally as device drivers 188A-C. For example, if device memory of balloon device 197A is exposed to guest OS 196A, the respective device driver (e.g., device driver 188A) of guest OS 196A may query an amount of memory available from balloon device 197A. Additionally, the respective device driver (e.g., device driver 188A) may report the amount of memory available to the respective guest OS (e.g., guest OS 196A). The hypervisor 180 and respective guest driver 188A-C may add "usable" memory and remove "unused" memory from a respective guest OS 196A-B.

As used herein, "usable" memory is memory that is usable or made available to the guest OS (e.g., guest OS 196A-B). For example, initialization memory is exposed to the guest OS as "usable" memory that the guest uses to initialize. Additionally, balloon device drivers may add "usable" memory to the guest OS (e.g., guest OS 196A-B) by deflating balloon devices 197A-C and exposing the balloon device memory to the guest OS (e.g., guest OS 196A-B). Additionally, as used herein, "unused" memory is memory that is not being used by the guest OS (e.g., guest OS 196A-B). For example, "unused" memory may be "usable" memory that the guest OS no longer needs (e.g., due to a period of inactivity or decreased network traffic). In another example, "unused" memory may be balloon device memory that the guest OS may not use (and thus is "unused" by the guest OS) because it is still part of the inflated balloon device and is not currently exposed to the guest OS (e.g., guest OS 196A-B).

Similarly, as used herein, "unusable" memory is memory that is currently not made available to the guest OS (e.g., guest OS 196A-C). For example, the memory of an inflated balloon device is "unusable" memory to the guest OS (e.g., guest OS 196A-C) because the memory is not exposed to the guest OS and thus the guest OS (e.g., guest OS 196A-C) is unable to use the memory. Potentially usable memory is memory that the device driver may query to make usable by the guest OS.

In an example, a virtual machine 170A may execute a guest operating system 196A and run applications 198A-B which may utilize the underlying VCPU 190A, VMD 193A, and VI/O device 194A. One or more applications 198A-B may be running on a virtual machine 170A under the respective guest operating systems 196A-B. A virtual machine (e.g., VM 170A-B, as illustrated in FIG. 1) may run on any type of dependent, independent, compatible, and/or incompatible applications on the underlying hardware and OS. In an example, applications (e.g., App 198A-B) run on a virtual machine 170A may be dependent on the underlying hardware and/or OS 186. In another example embodiment, applications 198A-B run on a virtual machine 170A may be independent of the underlying hardware and/or OS 186. For example, applications 198A-B run on a first virtual machine 170A may be dependent on the underlying hardware and/or OS 186 while applications (e.g., application 198C-D) run on a second virtual machine (e.g., VM 170B) are independent of the underlying hardware and/or OS 186. Additionally, applications 198A-B run on a virtual machine 170A may be compatible with the underlying hardware and/or OS 186. In an example embodiment, applications 198A-B run on a virtual machine 170A may be incompatible with the underlying hardware and/or OS 186. For example, applications 198A-B run on one virtual machine 170A may be compatible with the underlying hardware and/or OS 186 while applications 198C-D run on another virtual machine 170B are incompatible with the underlying hardware and/or OS 186. In an example embodiment, a device may be implemented as a virtual machine (e.g., virtual machine 170A-B).

The computer system 100 may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Virtual machines 170A-B may be provisioned on the same host or node (e.g., node 110A) or different nodes. For example, VM 170A and VM 170B may both be provisioned on node 110A. Alternatively, VM 170A may be provided on node 110A while VM 170B is provisioned on node 110B. Nodes 110A-C may be non-uniform memory access ("NUMA") nodes.

In an example, balloon memory may be located on balloon devices 197A-C. Each balloon device 197A-C may be associated with a memory region (e.g., a start address and an end address in the memory region). Additionally, the balloon devices 197A-C may be virtual devices. In an example, each balloon device 197A-C may be associated with a respective NUMA node (e.g., nodes 110A-C). For example, balloon device 197A may be associated with node 110A, balloon device 197B may be associated with node 110B, and balloon device 197C may be associated with node 110C.

As used herein, physical processor or processor 120A-E refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-E may be interconnected using a variety of techniques, ranging from a point-to-point processor interconnect, to a system area network, such as an Ethernet-based network. Local connections within each node, including the connections between a processor 120A-E and a memory device 130A-D may be provided by one or more local buses of suitable architecture, for example, peripheral component interconnect (PCI).

Figure 2:
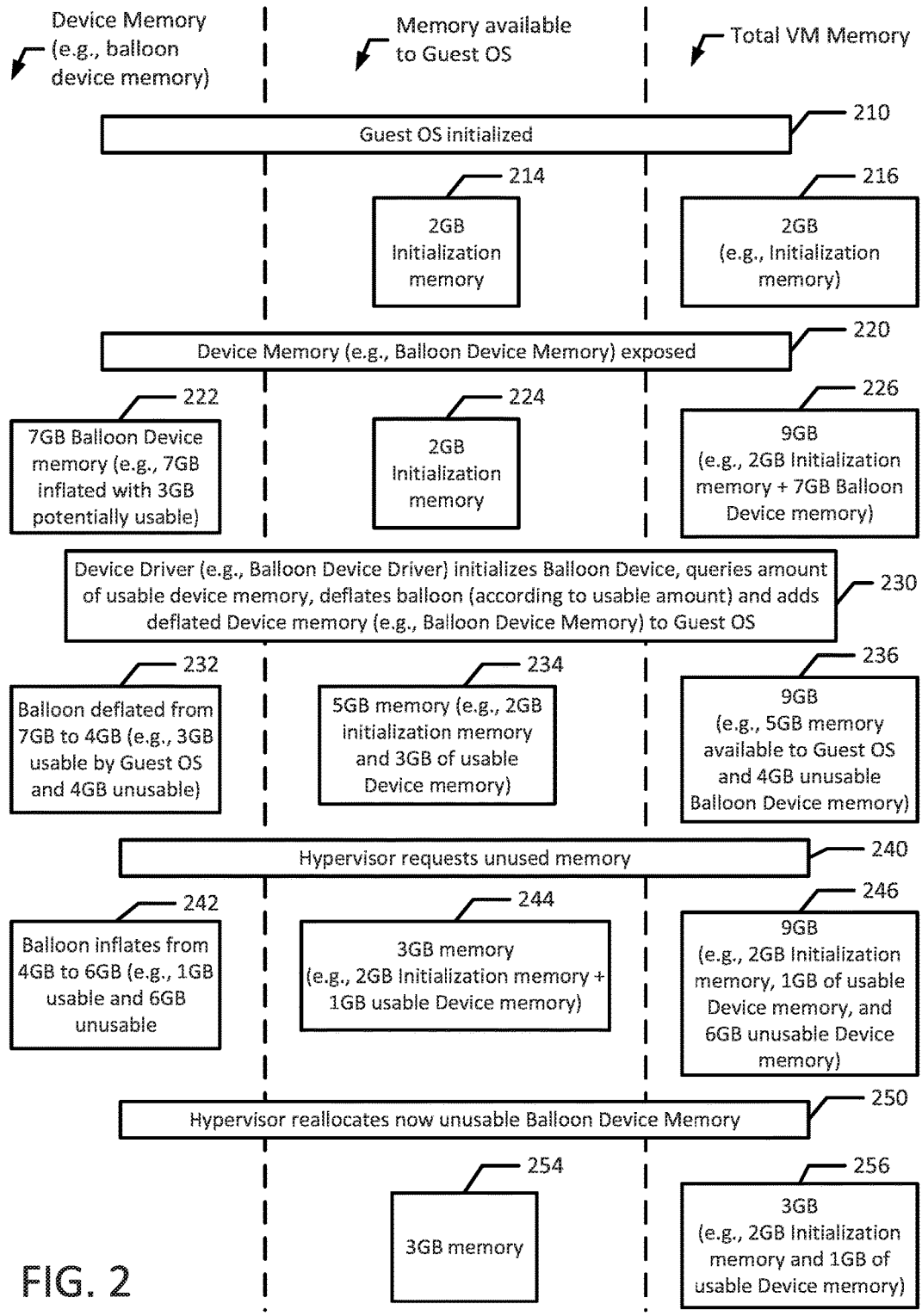
FIG. 2 illustrates a block diagram of virtual machine memory overcommit by reverse ballooning according to an example embodiment of the present disclosure.

FIG. 2 illustrates a block diagram of virtual machine memory overcommit by reverse ballooning. In a virtual machine (e.g., VM 170B), a device driver (e.g., device driver 188C, for example, a balloon device driver) may inflate and deflate device memory (e.g., balloon device memory) of a balloon device (e.g., balloon device 197C) in order to make more or less memory available to a guest OS (e.g., guest OS 196C). As illustrated in FIG. 2, guest OS 196C initializes (block 210) with 2 GB of initialization memory (block 214), which is the total amount of memory available to the virtual machine 170B (block 216). For example, the virtual machine 170B may be allocated enough memory (e.g., 2 GB) for the guest OS 196C to initialize, but typically not enough to execute additional applications (e.g., application 198C-D) or programs beyond initialization, which prevents guest OS 196C from prematurely using other virtual machine memory thereby causing the guest SO 196C to crash. To provide additional memory to the virtual machine 170B and/or guest OS 196C, balloon device memory may be exposed to the virtual machine 170B (block 220). For example, the device memory, such as balloon device memory may be exposed to guest OS 196C as device memory of balloon device 197C, which is available to the device driver 188C (e.g., balloon device driver). In the illustrated example, 7 GB of balloon device memory is exposed to guest OS 196C and inflated in the balloon device 197C with 3 GB of the available 7 GB as potentially usable (block 222). The guest OS 196C only has access to the 2 GB of initialization memory (block 224) even though there is 9 GB of total memory for virtual machine 170C (block 226). For example, the balloon device 197C is inflated to 7 GB, so even though there is 9 GB of total memory exposed to virtual machine 170C, only 2 GB (e.g., initialization memory) is seen as "usable" by the guest OS 196C. The other 7 GB of memory appears to guest OS 196C as "unusable" memory or memory inflated in balloon device 197C. For example, device memory, such as balloon device memory is "unusable" memory prior to exposure to the guest OS by a device driver 188, such as a balloon device driver.

Then, the device driver 188C (e.g., balloon device driver) initializes the balloon device 197C, queries an amount of usable device memory, deflates the balloon (according to the usable amount), and adds deflated device memory (e.g., balloon device memory) to the guest OS 196C (block 230). By allowing the device driver 188C to handle the device memory, the guest OS 196C is prevented from trying to use more than the 2 GB of initialization memory and the 3 GB of usable balloon device memory in the 9 GB of memory available to the virtual machine 170C before the boot sequence completes (e.g., device driver 188C initializes in the boot sequence), which advantageously prevents unauthorized memory uses that may result in the guest OS 196C crashing. To add the device memory (e.g., balloon device memory) to the guest OS 196C, the balloon device 197C deflates from 7 GB to 4 GB (block 232) thereby providing 3 GB of usable device memory to the guest OS 196C, such that 5 GB of memory is available to the guest OS 196C (block 234). Since the balloon device 197C is part of virtual machine 197C, virtual machine 197C still has 9 GB of memory available to the virtual machine (block 236). However, now 5 GB is available to the guest OS 196C (e.g., 2 GB of initialization memory and the 3 GB of usable balloon device memory added to the guest OS by the device driver 188C). The guest OS 196C may use the 5 GB of memory to execute processes and task or run applications (e.g., applications 198C-D). The additional 4 GB of balloon device memory inflated in balloon device 197C may be added to guest OS upon instruction from hypervisor 180.

The hypervisor 180 may request "unused" memory (block 240). For example, during periods of inactivity or reduced network traffic, VM 170C and/or guest OS 196C may be using less than the total amount of memory exposed to them. In the illustrated example, 2 GB out of 3 GB of usable balloon device memory may be "unused" (e.g., 3 GB of memory is used by guest OS 196C). The balloon device 197C inflates from 4 GB to 6 GB (block 242) thereby turning 2 GB of balloon device memory that was previously available to guest OS 196C to unusable device memory. After the balloon device 197C inflates, the guest OS 196C has 3 GB of memory (e.g., 2 GB of initialization memory and 1 GB of remaining "usable" balloon device memory (block 244). For example, the guest OS 196C has the 2 GB of initialization memory and 1 GB usable device memory that was previously added by the device driver 188C from when the balloon device 197C deflated (e.g., as illustrated in block 232). Since the balloon device 197C is part of virtual machine 197C, virtual machine 197C still has 9 GB of memory available to the virtual machine (block 246). For example, virtual machine 197C has the 2 GB of initialization memory, 1 GB of usable device memory previously added by the device driver 188C from the balloon device 197C, and 6 GB of unusable balloon device memory in the inflated balloon device 197C.

The hypervisor 180 reallocates now unusable balloon device memory (block 250). After returning the "unused" memory, the guest OS 196C has 3G of "usable" memory (block 254) and the virtual machine 170B has a total 3 GB of memory (e.g., 2 GB of initialization memory and 1 GB of usable device memory) (block 256). For example, the 6 GB of device memory (e.g., balloon device memory) inflated in balloon device 197C is returned to the hypervisor 180 and no longer available to VM 170B. After the "unused" memory is returned to hypervisor 180, the hypervisor 180 may remove the host memory 184 backing the device memory (e.g., balloon device memory). The hypervisor may reallocate the returned memory to other virtual machines (e.g., VM 170A) to achieve virtual machine memory overcommit.

Figure 3:
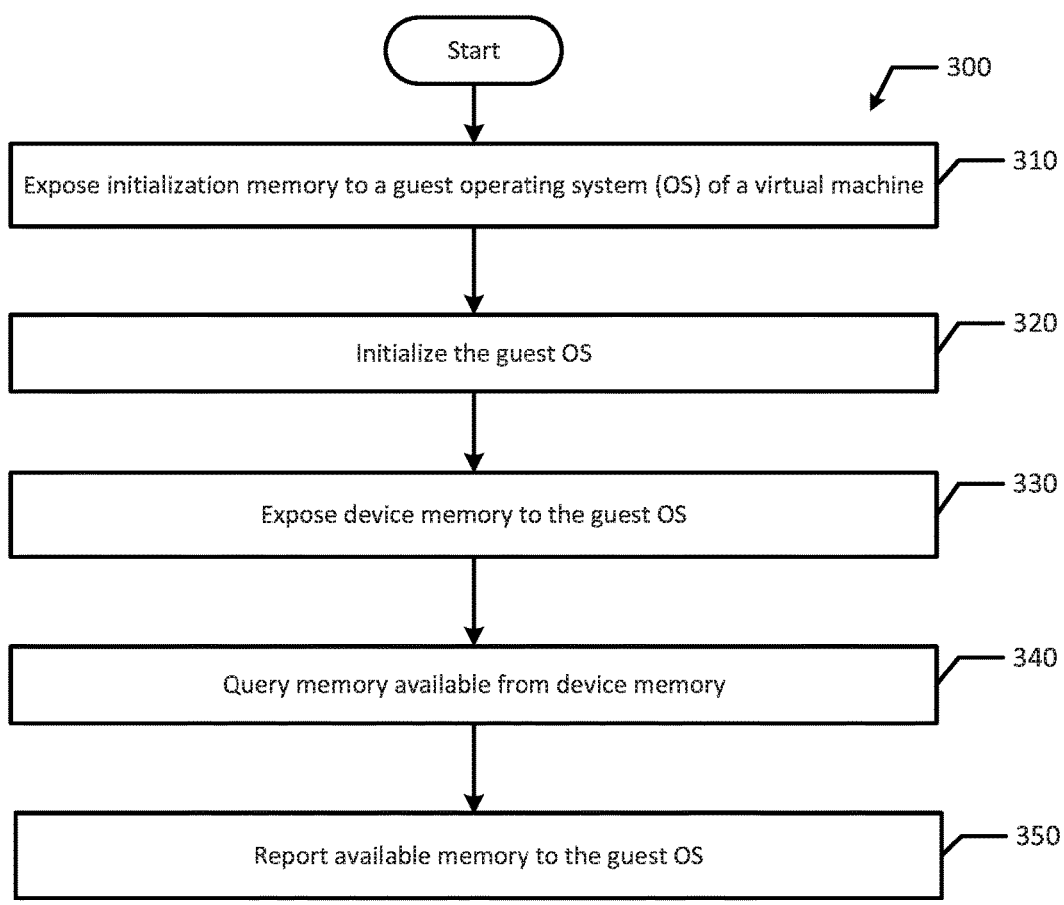
FIG. 3 illustrates a flowchart of an example process for virtual machine memory overcommit by reverse ballooning according to an example embodiment of the present disclosure.

FIG. 3 illustrates a flowchart of an example method 300 for virtual machine memory overcommit by reverse ballooning according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may comprise hardware (circuitry, dedicated logic, etc.), software, or a combination of both.

The example method 300 includes exposing initialization memory to a guest operating system of a virtual machine (block 310). For example, a hypervisor 180 may expose initialization memory to a guest OS (e.g., guest OS 196C, hereinafter guest OS 196) of a virtual machine (e.g., virtual machine 170C, hereinafter virtual machine 170). In an example, initialization memory may be enough memory to initialize the guest OS 196 and/or virtual machine 170. In another example, the initialization memory may include some additional leftover memory beyond what is used for initialization. For example, the initialization memory may allow for a small application or task to start using the leftover initialization memory. Then, the hypervisor initializes the guest OS (block 320). For example, the hypervisor 180 may initialize the guest OS with the exposed initialization memory. The hypervisor exposes device memory to the guest OS (block 330). For example, after initialization, the hypervisor 180 exposes device memory to the guest OS. In an example, the device memory may be balloon device memory from a balloon device (e.g., balloon device 197C, hereinafter balloon device 197), which may eventually be used by guest OS 196 of the virtual machine 170 to run additional applications (e.g., applications 198C-D) and execute tasks beyond the initialization tasks during startup.

Then, a device driver queries memory available from the device memory (block 340). For example, the device driver (e.g., device driver 188C, hereinafter device driver 188) such as a balloon device driver may query an amount (e.g., 7 GB) of memory available from the device memory of balloon device 197. In an example, the device driver 188 may query an amount of memory available from multiple devices (e.g., balloon devices). In another example, the device driver 188 may query an amount of memory available from a single device (e.g., balloon device 197C). Then, the device driver reports the available memory to the guest OS (block 350). For example, after querying the amount of memory available from the device memory of balloon device 197, the device driver 188 may report the amount of memory available (e.g., 7 GB) to the guest OS 196. The hypervisor 180 may instruct the device driver 188 to add the 7 GB of available memory from the balloon device 197 to the guest OS 196. For example, after receiving an instruction from the hypervisor 180, the device driver 188 may deflate the balloon device 197 to expose the 7 GB of memory (or a portion of the 7 GB of memory) to the guest OS 196. For example, referring back to FIG. 2, the device driver 188 deflated twice to provide 1 GB and 6 GB of device memory from balloon device 197 to the guest OS 196.

Figure 4A:
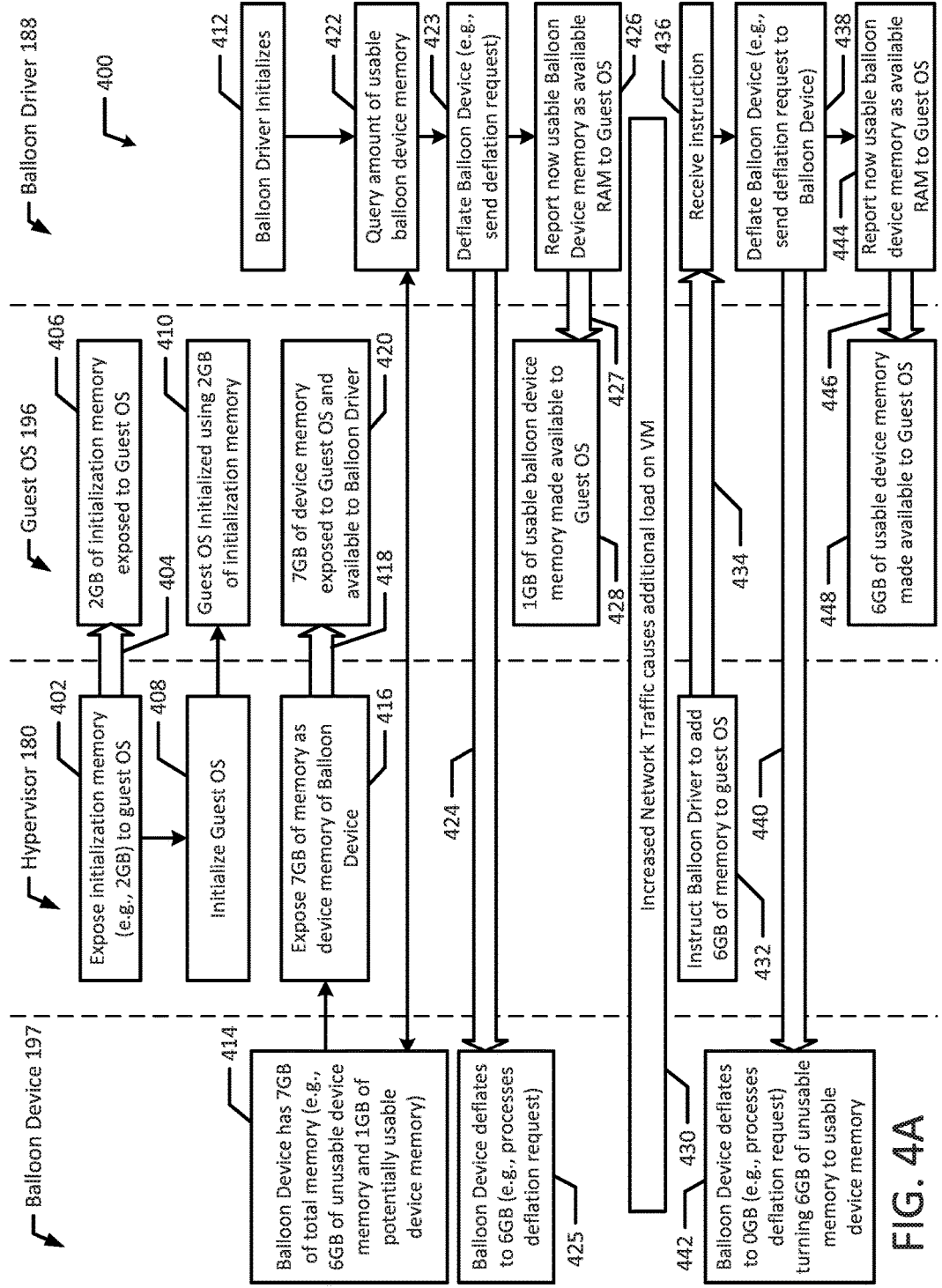
FIGS. 4A and 4B illustrate a flow diagram of an example process for virtual machine memory overcommit by reverse ballooning according to an example embodiment of the present disclosure.
Figure 4B:
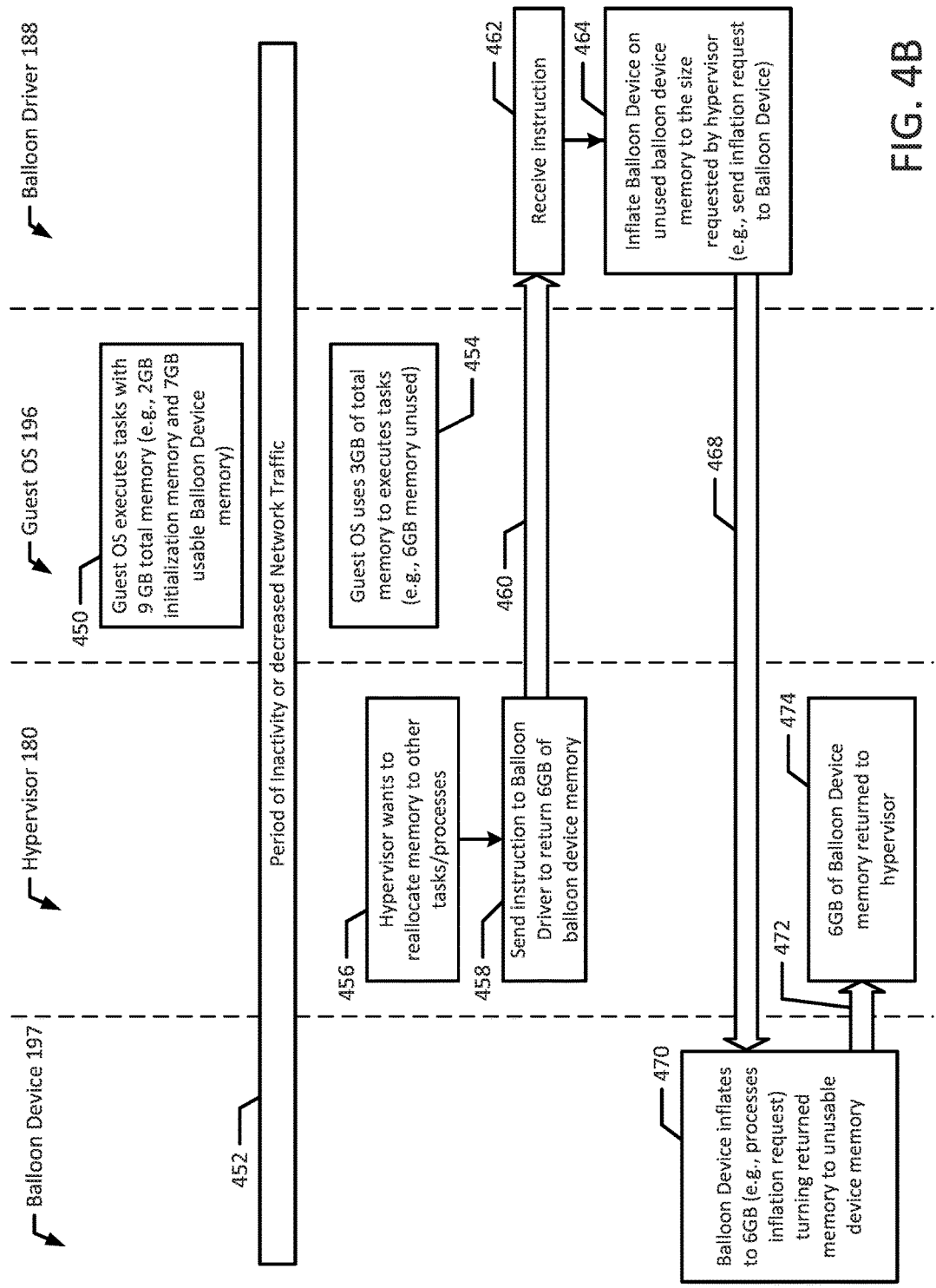

FIGS. 4A and 4B illustrate a flowchart of an example method 400 for virtual machine memory overcommit by reverse ballooning in accordance with an example embodiment of the present disclosure. Although the example method 400 is described with reference to the flowchart illustrated in FIGS. 4A and 4B it will be appreciated that many other methods of performing the acts associated with the method 400 may be used. For example, the order of some of the blocks may be changed, certain blocks may be combined with other blocks, and some of the blocks described are optional. For example, a hypervisor 180 and guest OS 196 may communicate with a device driver 188 (e.g., balloon device driver) which controls a device (e.g., balloon device 197) to perform example method 400.

In the illustrated example, hypervisor 180 exposes initialization memory to the guest OS 196 (blocks 402 and 404). For example, the hypervisor 180 may expose 2 GB of initialization memory to guest OS 196 so that guest OS 196 has enough memory to initialize (e.g., perform any necessary initialization tasks at startup). Then the initialization memory is exposed to the guest OS 196 (block 406). For example, the 2 GB of initialization memory is exposed and made available to guest OS 196. In an example, more than 2 GB of initialization memory may be exposed to guest OS 196. It should be appreciated that the amount of initialization memory exposed to guest OS 196 may vary depending on various requirements of hardware, software, and/or environment of the virtual machine 170 associated with guest OS 196. After exposing initialization memory to the guest OS 196, the hypervisor 180 initializes the guest OS 196 (block 408). For example, the hypervisor 180 may initialize the guest OS 196 after startup in order to run various tasks and programs or applications (e.g., applications 198C-D). Then, the guest OS 196 is initialized using the initialization memory (block 410).

At some point after guest (e.g., guest OS 196) initialization, a balloon device driver 188 initializes (block 412). For example, the balloon device driver 188 may initialize at the start of the boot sequence or later in the boot sequence. In an example, the guest OS 196 may scan for possible devices, locate the balloon device driver 188, and initialize the balloon device driver 188. The balloon device driver 188 may initialize after memory is exposed to balloon device 197. For example, initialization may be delayed or disabled, for example, during a safe boot process. In another example, the balloon device driver 188 may initialize before memory is exposed to balloon device 197. In the illustrated example, balloon device 197 has 7 GB of total memory (block 414). For example, the balloon device 197 may be inflated to 7 GB with 6 GB of unusable device memory and 1 GB of potentially usable device memory (e.g., before rebooting).

The hypervisor 180 exposes 7 GB of memory as device memory of balloon device 197 to the guest OS 196 (blocks 416 and 418). For example, the hypervisor 180 exposes memory of balloon device 197 as device memory to the guest OS 196. In an example, the memory is available to the balloon device driver 188, which advantageously prevents the guest OS 196 from prematurely using the device memory. By making the device memory available to the balloon device driver 188, the memory is protected from premature use by the guest OS 196 until the balloon device driver 188 initializes, which advantageously allows a delayed balloon device driver 188 startup. For example, when rebooting in a different kernel, the guest OS 196 may try to consume additional memory. Then, the 7 GB of device memory is exposed to the guest OS 196 and available to the balloon device driver 188 (block 420). For example, the device memory of balloon device 197 is only available to the balloon device driver 188, which advantageously prevents the guest OS 196 and/or virtual machine 170 from prematurely utilizing the balloon device memory before the balloon device driver 188 initializes. In an example, device memory from multiple balloon devices 197 may be exposed to the guest OS 196 and available to the balloon device driver 188. For example, each balloon device 197 may be associated with its own memory (e.g., a memory region with a start address and an end address of the memory region). In an example, each balloon device may relate to a memory page. The balloon devices 197 may inflate and/or deflate serially. In another example, balloon devices 197 may inflate and/or deflate randomly.

After memory is exposed as device memory, the balloon device driver 188 queries the amount of usable balloon device memory available form the balloon device 197 (block 422). For example, the balloon device driver 188 may query the available memory from balloon device 197 to determine that 1 GB is potentially usable device memory from the 7 GB of balloon device memory. In an example, the balloon device driver 188 queries a start address and an end address of a memory region associated with the balloon device 197. Additionally, the balloon device may be associated with multiple memory regions. In the illustrated example, the balloon device driver 188 has already allocated 1 GB of the 7 GB of memory as "usable" memory to the guest OS 196. The balloon device driver 188 may query the balloon device 197 to determine the amount of usable balloon device memory. Then, the balloon device driver 188 deflates the balloon device 197 (blocks 423 and 424). For example, the balloon device driver 188 may send a deflation request to the balloon device 197 to add additional memory to the guest OS 196. Then, the balloon device 197 deflates to 6 GB (block 425). For example, the balloon device 197 receives and processes the deflation request and deflates from 7 GB to 6 GB. Then, the balloon device driver 188 reports the now usable balloon device memory as available random access memory ("RAM") to guest OS 196 (blocks 426 and 427). For example, the balloon device driver 188 may report 6 GB of memory available to the guest OS 196. The 6 GB of memory appears as "unusable" memory to guest OS 196 because it is inflated in balloon device 197. Then, 1 GB of usable balloon device memory is made available to the guest OS 196 (block 428). For example, the guest OS 196 may receive the report and determines that there is 9 GB of total memory for the virtual machine 170, (e.g., 2 GB of initialization memory, 1 GB of usable device memory added from balloon device 197, and another 6 GB of "unusable" memory inflated in balloon device 197).

In the illustrated example, increased network traffic causes additional load on the virtual machine 170 (block 430). For example, there may be increased use of applications 198, which places additional load on virtual machine 170. In response to the increased load, the hypervisor 180 instructs the balloon device driver 188 to add 6 GB of memory to the guest OS 196 (blocks 432 and 434). For example, the hypervisor 180 may send an instruction to the balloon device driver 188, such as a deflation request. Then the balloon device driver 188 receives the instruction (block 436). For example, the balloon device driver 188 may receive a deflation request from the hypervisor 180. In an example, the deflation request may indicate an amount of memory or a specific range of memory (e.g., memory addresses) to provide to guest OS 196.

After receiving the instruction, the balloon device driver 188 deflates the balloon device 197 (blocks 438 and 440). For example, the balloon device driver 188 may send a deflation request to the balloon device 197 to add additional memory to the guest OS 196. Then, the balloon device 197 deflates (block 442). For example, the balloon device 197 receives and processes the deflation request and deflates from 6 GB to 0 GB thereby turning 6 GB of unusable device memory to usable device memory. After deflating, the balloon device driver 188 reports the now usable balloon device memory as available random access memory ("RAM") to guest OS 196 (blocks 444 and 446). By exposing the deflated balloon device memory of balloon device 197 to the guest OS 196, the memory is made available as "usable" memory to guest OS 196 to accommodate the additional load on virtual machine 170. The 6 GB of usable balloon device memory is made available to the guest OS 196 (block 448). In an example, the 6 GB of memory may be "usable" by guest OS 196 as RAM. Depending on network traffic, less than the 6 GB of memory may be added to the guest OS 196.

Continuing on FIG. 4B, the guest OS 196 may execute tasks with the 9 GB of total memory (block 450). For example, after receiving the additional 6 GB of usable device memory from the balloon device 197 on top of the 1 GB of usable balloon device memory and the 2 GB of initialization memory, the guest OS 196 has 9 GB of memory to execute tasks and run applications (e.g., applications 198C-D). The balloon device memory may have been previously allocated to VM 170 from a different virtual machine to enable virtual machine memory overcommit.

After some time, a period of inactivity or decreased network traffic may occur (block 452). Due to the inactivity, the guest OS 197 uses 3 GB of total memory to execute tasks (block 454). For example, by using 3 GB of the available 9 GB of memory, 6 GB of memory is "unused" by the guest OS 196. In the illustrated example, the hypervisor 180 decides to reallocate memory to other tasks and processes (block 456). For example, other processes, guests 196, or virtual machines 170 may need additional memory.

The hypervisor 180 sends an instruction to the balloon device driver 188 to return 6 GB of balloon device memory (blocks 458 and 460). For example, the hypervisor 180 may trigger the guest device driver 188 to return memory by inflating balloon device 197. Then, the balloon device driver 188 receives the instruction (block 462). For example, the hypervisor 180 may send an inflation request to the balloon device driver 188. In an example, the inflation request may indicate an amount of memory or a specific range of memory (e.g., memory addresses) to return to the hypervisor 180. Then, the balloon device driver 188 inflates the balloon device 197 on unused balloon device memory to the size requested by the hypervisor 180 (blocks 464 and 468). For example, the balloon device driver 188 may inflate the balloon device 197 by sending an inflation request to the balloon device 197. Then, the balloon device 197 inflates from 0 GB to 6 GB (blocks 470 and 472). For example, the balloon device 197 receives and processes the inflation request to inflate to 6 GB turning unused memory to unusable device memory.

After the balloon device 197 inflates, the 6 GB of balloon device memory is returned to the hypervisor 180 (block 474). In an example, the hypervisor 180 removes host memory 184 backing the 6 GB of "unused" memory. The balloon device driver 188 may return the "unused" memory to the hypervisor 180 so that the hypervisor 180 can reallocate the "unused" memory to other tasks and/or processes. In an example, the hypervisor 180 may reallocate the entire 6 GB of memory. In another example, the hypervisor 180 may reallocate less than the 6 GB of "unused" memory and reserve some of the memory in the balloon device 197 in case guest OS 196 needs additional memory in the near future. It should be appreciated that there may be multiple cycles of adding memory by the hypervisor 180 and returning memory to the hypervisor 180 during the life of virtual machine 170, which may be relatively long lived.

Figure 5:
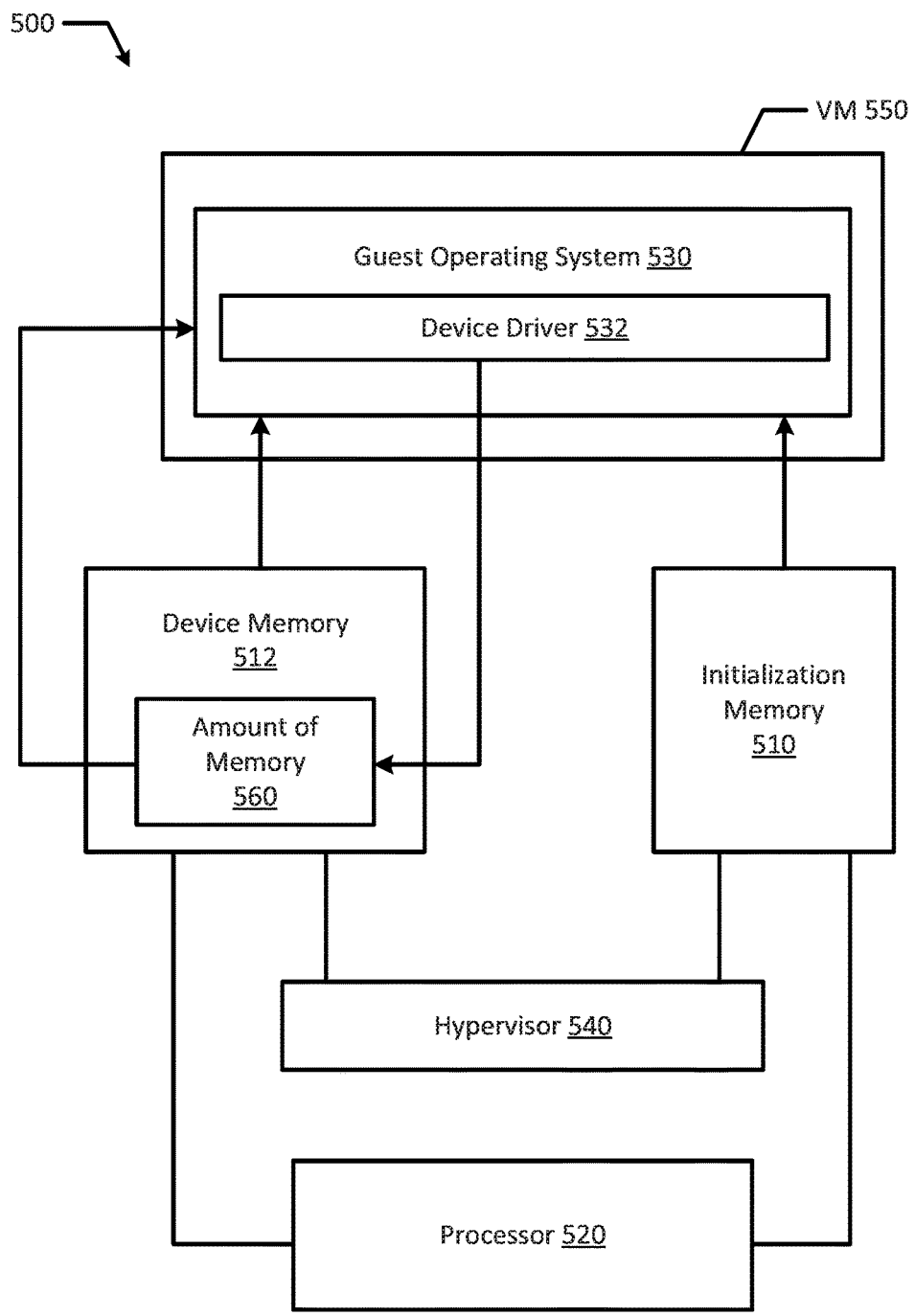
FIG. 5 illustrates a block diagram of an example virtual machine memory overcommit system according to an example embodiment of the present disclosure.

FIG. 5 is a block diagram of an example virtual machine memory overcommit system 500 according to an example embodiment of the present disclosure. The virtual machine memory overcommit system 500 includes an initialization memory 510, a device memory 512, at least one processor in communication with the initialization memory 510 and the device memory 512, a guest operating system 530, and a hypervisor 540 executing on the at least one processor 520. The hypervisor is configured to expose the initialization memory 510 to the guest OS 530 of virtual machine 550. Additionally, the hypervisor 540 is configured to initialize the guest OS 530 and expose the device memory 512 to the guest OS 530. The device driver 532 is configured to query an amount of memory 560 available from the device memory 512 and report the amount of memory 560 available to the guest OS 530.

Instead of the guest OS 530 trying to use more memory than permitted, for example, all of or too much of the virtual machine memory (e.g., initialization memory 510 and device memory 512), the device memory 512 is initially unavailable to the virtual machine 550 and the rest of the memory is exposed to the guest OS 530 as device memory 512, which is available to device driver(s) 532. Thus, the guest OS 530 is prevented from accessing the device memory 512 until after the device driver 532 initializes, which advantageously prevents the virtual machine 550 from prematurely accessing the memory, which prevents the hypervisor 540 from having to allocate additional memory to the virtual machine 550 or failing a request by the virtual machine 540 (e.g., stopping the virtual machine 540) due to insufficient memory.

The systems and methods disclosed herein are inextricably tied to and provide improvements to computer technology. For example, adding a layer of constraint (e.g., using device driver 188 to add and remove memory from guest OS 196) before adding memory to a virtual machine 170 to achieve virtual machine memory overcommit, prevents the guest OS 196 of the virtual machine 170 from trying to use more memory than the system permits for initialization, thereby preventing the guest OS 196 from crashing or the hypervisor 180 from allocating additional system resources to the virtual machine 170. The solution described herein is necessarily rooted in computer technology to overcome a problem specifically arising in the realm of computer networks, and more specifically to memory overcommit, by addressing the challenge of allocating memory for virtual machine memory overcommit. For example, some memory is initially unavailable to the virtual machine 170, while the hypervisor 180 exposes initialization memory to the virtual machine 170 for the guest OS 196 to initialize. The remaining memory is exposed to the guest OS 196 as device memory (e.g., balloon device memory), which is available to a device driver 188 (e.g., balloon device driver). After the device driver 188 initializes, the device driver 188 queries the amount of balloon device memory available from the hypervisor 180 and reports this memory as available memory (e.g., random access memory "RAM") to the guest OS 196. Then, the hypervisor 180 instructs the device driver 188 to add memory to the guest OS 196 and the device driver 188 exposes the balloon device memory to the guest OS 196 as needed, which advantageously prevents the guest OS 196 from using the balloon device memory until after the device driver 188 initializes. The described system and methods limit access to the balloon device memory (e.g., memory of balloon device 197) from the guest OS 196 until the device driver 188 initializes in the boot sequence, which prevents the guest OS 196 from crashing and/or the hypervisor 180 from allocating additional resources to the virtual machine 170 to prevent a crash, thereby improving system performance, hardware utilization, and virtual machine density not previously performable.

By limiting what memory the guest OS 196 can access upon initialization, the systems and methods disclosed herein offers the benefit of efficiently allocating memory and preventing the guest OS 196 from crashing to provide optimized virtual machine memory overcommit, which is a technology-based solution that overcomes the disadvantages of allocating memory according to generic and conventional methods. The hypervisor 180 executing on a processor (e.g., CPU 120) acts in concert with guest OS 196, device driver 188, and balloon device 197 to provide a non-conventional and non-generic arrangement that improve existing virtual machine memory overcommit techniques to reduce the likelihood of the guest OS 196 crashing and conserves system resources by preventing the guest OS 196 from using more memory than allowed, even if the device driver initialization is delayed or if the device driver 188 is disabled. Thus, system performance, hardware utilization, and virtual machine density is improved for virtual machine memory overcommit systems.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
an initialization memory;
a device memory;
at least one processor in communication with the initialization memory and the device memory;
a guest operating system (OS) including a device driver; and
a hypervisor executing on the at least one processor, wherein the hypervisor is configured to:
expose the initialization memory to the guest OS of a virtual machine,
initialize the guest OS, and
expose the device memory to the guest OS,
wherein the device driver is configured to:
query an amount of memory available from the device memory, and
report the amount of memory available to the guest OS.

2. The system of claim 1, wherein the hypervisor is further configured to instruct the device driver to expose additional memory to the guest OS.

3. The system of claim 2, wherein the additional memory is the device memory.

4. The system of claim 2, wherein the device driver is further configured to expose the additional memory to the guest OS, and wherein the device driver exposes the additional memory to the guest OS by sending a deflation request to a balloon device.

5. The system of claim 1, further comprising an unused memory, wherein the device driver is further configured to request the unused memory from the guest OS, and wherein the device driver requests the unused memory from the guest OS by sending an inflation request to a balloon device.

6. The system of claim 5, wherein the hypervisor is further configured to:
remove the unused memory from the guest OS, and
return the unused memory to a host memory.

7. The system of claim 1, wherein the device memory is a memory region, and querying the amount of memory available from the device memory includes querying a start address and an end address in the memory region.

8. The system of claim 1, wherein the device memory includes a plurality of memory regions.

9. The system of claim 1, further comprising a second device memory and a second guest balloon driver in the guest OS, the second device driver configured to query a second amount of memory available from the second device memory exposed by the hypervisor.

10. The system of claim 9, wherein the device memory is a first memory region and the second device memory is a second memory region, the first memory region associated with a first balloon device, and the second memory region associated with a second balloon device.

11. The system of claim 10, wherein the first balloon device is associated with a first non-uniform memory access (NUMA) node and the second balloon device is associated with a second NUMA node.

12. A method comprising:
exposing, by a hypervisor, an initialization memory to a guest operating system of a virtual machine;
initializing, by the hypervisor, the guest OS;
exposing, by the hypervisor, a device memory to the guest OS;
querying, by a device driver, an amount of memory available from the device memory; and
reporting, by the device driver, the amount of memory available to the guest OS.

13. The method of claim 12, further comprising:
instructing, by the hypervisor, the device driver to expose additional memory to the guest OS.

14. The method of claim 13, wherein the additional memory is the device memory.

15. The method of claim 14, further comprising, exposing, by the device driver, the additional memory to the guest OS.

16. The method of claim 15, further comprising:
requesting, by the device driver, an unused memory from the guest OS;
removing, by the hypervisor, the unused memory from the guest OS; and
returning, by the hypervisor, the unused memory to a host memory.

17. The method of claim 12, wherein the device memory is a memory region, and querying the amount of memory available from the device memory includes querying a start address and an end address in the memory region.

18. The method of claim 12, further comprising:
exposing, by the hypervisor, a second device memory to the guest OS;
querying, by a second device driver, a second amount of memory available from the second device memory; and
reporting, by the second device driver, the second amount of memory available to the guest OS.

19. The method of claim 18, wherein the device memory is a first memory region and the second device memory is a second memory region, the first memory region associated with a first balloon device, and the second memory region associated with a second balloon device.

20. A non-transitory machine readable medium storing code, which when executed by a processor, is configured to:
expose an initialization memory to a guest operating system of a virtual machine;
initialize the guest OS;
expose a device memory to the guest OS;
query an amount of memory available from the device memory; and
report the amount of memory available to the guest OS.

* * * * *